US009342726B2

(12) United States Patent  
Fukuda et al.

(10) Patent No.: US 9,342,726 B2  
(45) Date of Patent: May 17, 2016

(54) IMAGING DEVICE, IMAGING METHOD, AND NON-TRANSITORY COMPUTER-READABLE MEDIUM

(71) Applicant: FUJITSU LIMITED, Kawasaki-shi, Kanagawa (JP)

(72) Inventors: Mitsuaki Fukuda, Sagamihara (JP); Soichi Hama, Atsugi (JP); Takahiro Aoki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 275 days.

(21) Appl. No.: 14/108,738

(22) Filed: Dec. 17, 2013

(65) Prior Publication Data

US 2014/0267761 A1 Sep. 18, 2014

(30) Foreign Application Priority Data

Mar. 18, 2013 (JP) ................. 2013-055475

(51) Int. Cl.
```
G06K 9/00      (2006.01)
H04N 5/232     (2006.01)
H04N 5/217     (2011.01)
H04N 5/335     (2011.01)
```

(52) U.S. Cl.  
CPC ............ *G06K 9/00013* (2013.01); *H04N 5/217* (2013.01); *H04N 5/23229* (2013.01)

(58) Field of Classification Search  
CPC . G03F 1/84; G03F 1/144; G06T 2207/30148; G06T 7/001; G06T 7/0042; G06T 2200/28; G06T 2207/10016; G06T 2207/10024; G06T 2207/10148; G06T 2207/20164; G06T 2207/20201; G06T 2207/30196; H04N 5/33; H04N 5/332; H04N 3/09; G01J 5/02; G01J 2005/0077  
See application file for complete search history.

(56) References Cited

U.S. PATENT DOCUMENTS

| | | | | |
|---|---|---|---|---|
| 5,978,041 A | * | 11/1999 | Masuda | H04N 5/126 348/563 |
| 8,390,821 B2 | * | 3/2013 | Shpunt | G01B 11/25 356/512 |
| 2004/0164246 A1 | * | 8/2004 | Lettington | H04N 3/09 250/334 |
| 2006/0290781 A1 | | 12/2006 | Hama | |
| 2008/0309771 A1 | * | 12/2008 | Takahashi | G02B 7/34 348/208.4 |
| 2009/0185266 A1 | * | 7/2009 | Stromberg | G02B 27/646 359/356 |
| 2009/0232367 A1 | | 9/2009 | Shinzaki | |
| 2010/0110291 A1 | * | 5/2010 | Owashi | H04N 5/073 348/529 |
| 2010/0165180 A1 | * | 7/2010 | Park | H04N 5/2256 348/371 |

(Continued)

FOREIGN PATENT DOCUMENTS

| | | |
|---|---|---|
| JP | 2007-010346 | 1/2007 |
| WO | 2005/069212 | 7/2005 |
| WO | 2010/086993 | 8/2010 |

*Primary Examiner* — Sath V Perungavoor  
*Assistant Examiner* — Howard D Brown, Jr.  
(74) *Attorney, Agent, or Firm* — Fujitsu Patent Center

(57) ABSTRACT

An imaging device that generates a taken image of an object in an image area by taking an image of each line structuring the image area, includes: an inclination estimate unit that estimates an inclination of the object based on a portion of the taken image corresponding to a first line and a portion of the taken image corresponding to a second line; an image estimate unit that estimates an image of the object to be generated when the image is taken having an inclination estimated by the inclination estimate unit, based on the inclination; and a correction process unit that corrects the taken image based on a result of a comparison between the taken image and the image estimated by the image estimated unit.

10 Claims, 15 Drawing Sheets

TIME [EXPOSURE TIMING]

(56) References Cited

U.S. PATENT DOCUMENTS

2010/0208087 A1* 8/2010 Ogawa .................. G06T 7/20 348/208.4
2010/0214423 A1* 8/2010 Ogawa ............ H04N 5/23248 348/208.4
2011/0267520 A1* 11/2011 Pyanet ............... H04N 5/23212 348/296
2011/0274318 A1 11/2011 Shindo et al.
2011/0280470 A1* 11/2011 Hayashi ............ G01N 21/9505 382/149

* cited by examiner

IMAGING DEVICE, IMAGING METHOD, AND NON-TRANSITORY COMPUTER-READABLE MEDIUM

CROSS-REFERENCE TO RELATED APPLICATION

This application is based upon and claims the benefit of priority of the prior Japanese Patent Application No. 2013-055475, filed on Mar. 18, 2013, the entire contents of which are incorporated herein by reference.

FIELD

A certain aspect of embodiments described herein relates to an imaging device, an imaging method, and a non-transitory computer-readable medium.

BACKGROUND

Generally, a feature quantity extracted from a biometric image taken by an imaging device is used for an authentication, in a biometric authentication device identifying an individual or performing a matching with use of biometric information that is information unique to each person. However, a posture or a distance is not always identical between a biometric image taken during a registration process and a biometric image taken during an authentication process. And so, Japanese Patent Application Publication No. 2007-010346 (hereinafter referred to as Document 1) discloses a technology for correcting an image.

An imaging device used for a biometric authentication device is mainly categorized into a global shutter type imaging device and a rolling shutter type imaging device. The rolling shutter type imaging device is different from a global shutter type imaging device that takes an image of whole of an image area at a time, and takes images of each line structuring an image area in order and generates a single image when imaging of all lines are finished. The rolling shutter type imaging device is cheaper than the global shutter type imaging device and can be downsized easily. Therefore, it is expected that the rolling shutter type imaging device is mounted on a small sized biometric authentication device.

SUMMARY

According to an aspect of the present invention, there is provided an imaging device that generates a taken image of an object in an image area by taking an image of each line structuring the image area, including: an inclination estimate unit that estimates an inclination of the object based on a portion of the taken image corresponding to a first line and a portion of the taken image corresponding to a second line; an image estimate unit that estimates an image of the object to be generated when the image is taken having an inclination estimated by the inclination estimate unit, based on the inclination; and a correction process unit that corrects the taken image based on a result of a comparison between the taken image and the image estimated by the image estimated unit.

DESCRIPTION OF EMBODIMENTS

A rolling shutter type imaging device takes images of each line structuring an image area in order. Therefore, a distortion may occur in a taken image when an object moves. The technology of Document 1 is not capable of correcting the distortion. When an image in which a distortion occurs is used for biometric authentication, authentication accuracy may be degraded because of a positional fluctuation of a feature point.

Figure 1A:
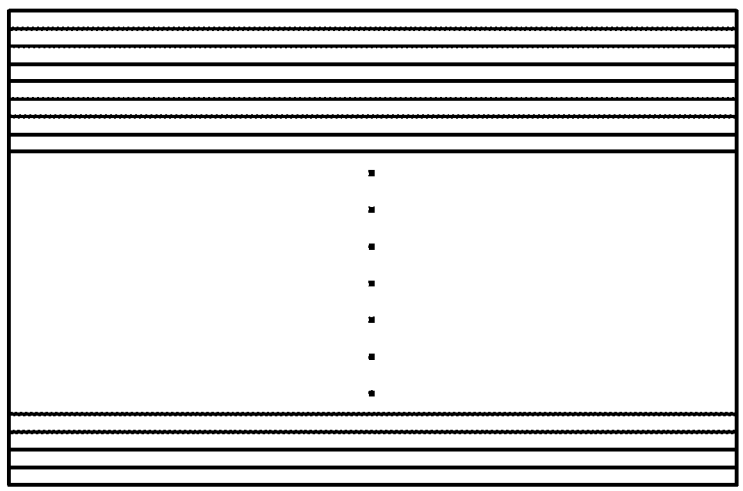
FIG. 1A illustrates a global shutter type imaging device.
Figure 1B:
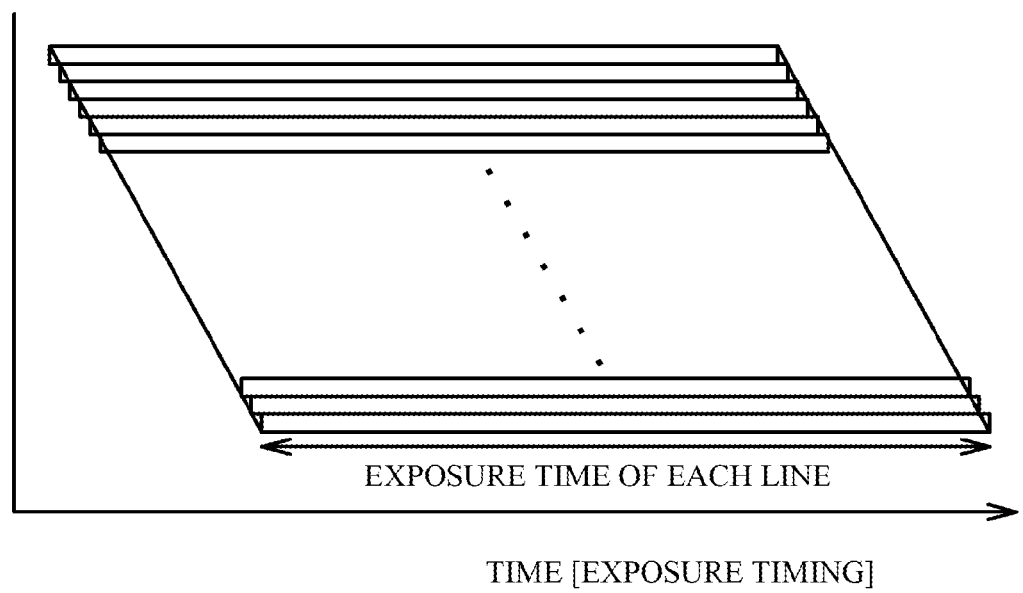
FIG. 1B illustrates a rolling shutter type imaging device.

A description will be given of a global shutter type imaging device and a rolling shutter type imaging device before describing embodiments. FIG. 1A illustrates a global shutter type imaging device. FIG. 1B illustrates a rolling shutter type imaging device.

As illustrated in FIG. 1A, the global shutter type imaging device takes an image of (develops) all lines of a screen together with each other. Therefore, it is possible to take an image without distortion even if an object moves, if an exposure time is sufficiently short. In contrast, as illustrated in FIG. 1B, the rolling shutter type imaging device sequentially takes images of each line of an image area. Thus, an exposure timing of each line differs little by little. In the example of FIG. 1B, an exposure timing differs little by little from a top line of an image area to a bottom line of the image area in order. Therefore, when the object moves in a period from an exposure of the top line to an exposure of the bottom line, a position of the object fluctuates in each exposed line. Thus, a distortion occurs in a taken image.

Figure 2:
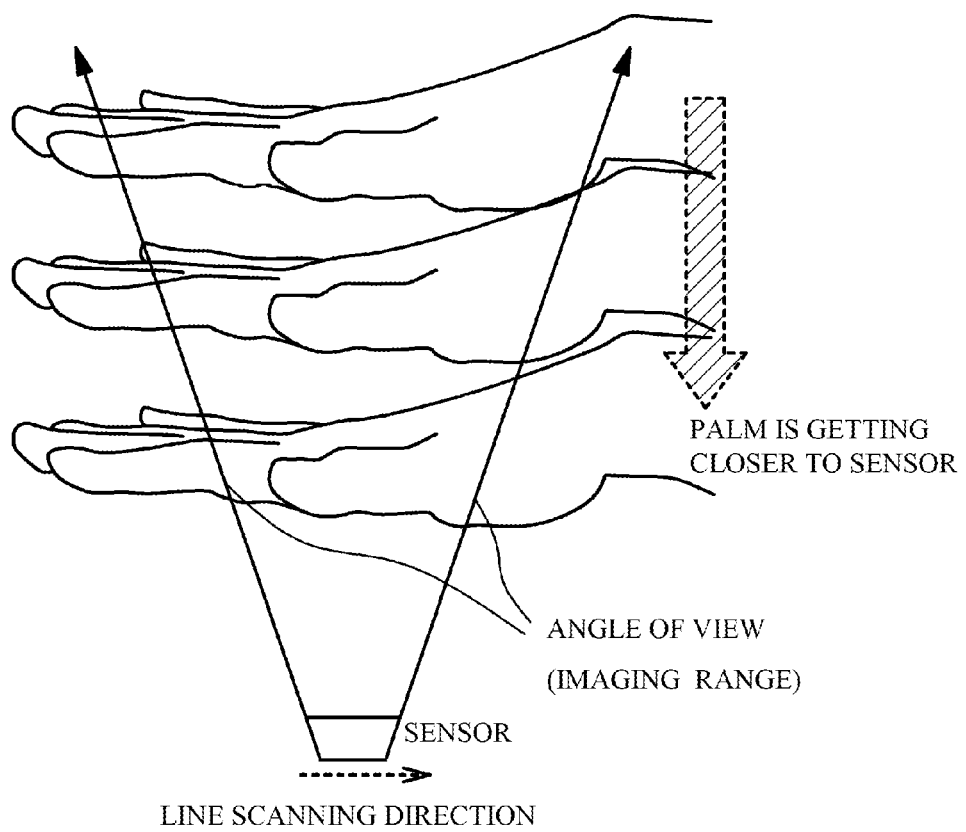
FIG. 2 illustrates a case where the rolling shutter type imaging device takes an image of a palm getting closer to an imaging device.

FIG. 2 illustrates a case where the rolling shutter type imaging device takes an image of a palm getting closer to the imaging device. In an example of FIG. 2, a line-scanning direction of the imaging device looks toward a wrist from a fingertip. That is, the imaging device takes an image with developing one line by one line from the fingertip to the wrist.

Thus, when an image of a palm getting closer to the imaging device is taken, an image of a faraway palm is taken in a line that is developed early (on the side of the fingertip), and an image of a closer palm is taken in a line that is developed late (on the side of the wrist).

Figure 3:
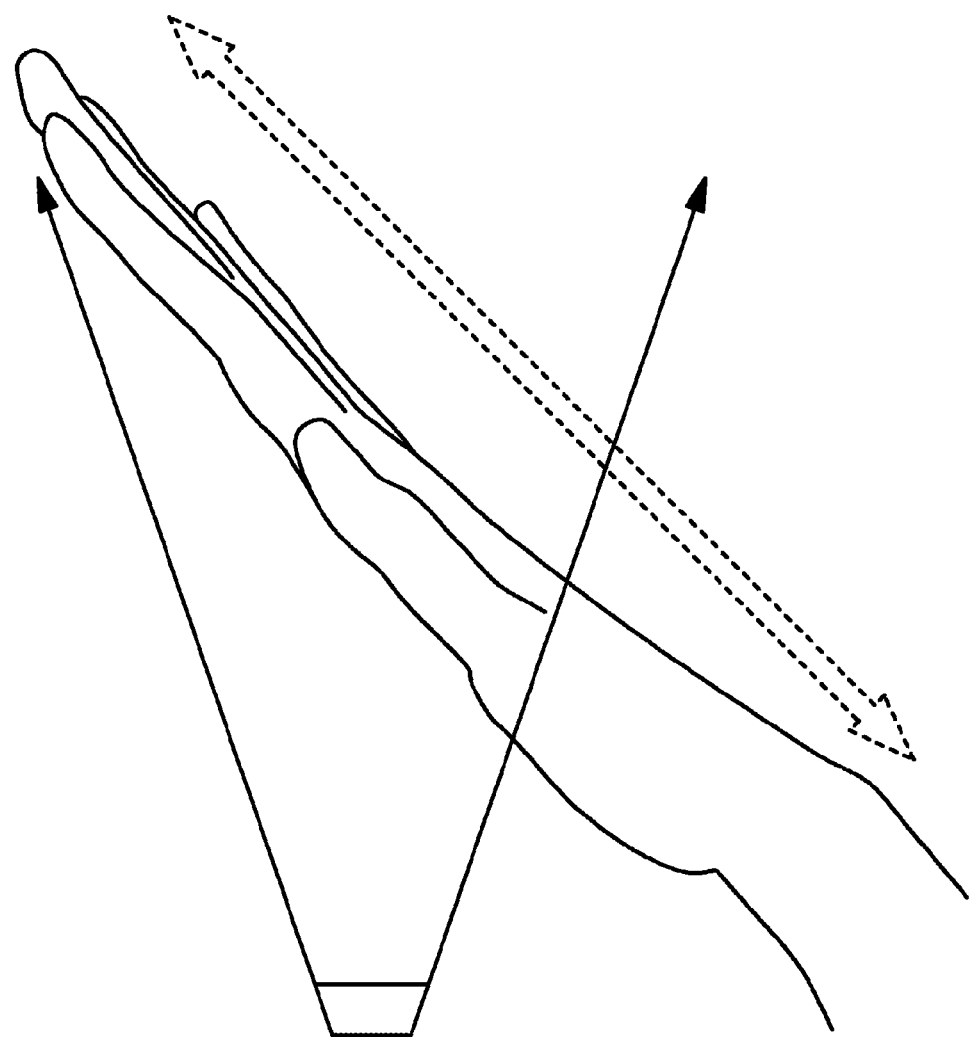
FIG. 3 illustrates a case where it is assumed that an image of a remained palm is taken.

FIG. 3 illustrates a case where it is assumed that an image of a remained palm is taken. As illustrated in FIG. 3, a fingertip is developed at a location far from the imaging device, and a portion near a wrist is developed at a location close to the imaging device. Therefore, in a case of a remained palm, an image approximated by a case where an image of a palm extended in an oblique longitudinal direction compared to an actual palm is taken. An extension in each line is uneven. A fingertip tends to extend largely.

Figure 4:
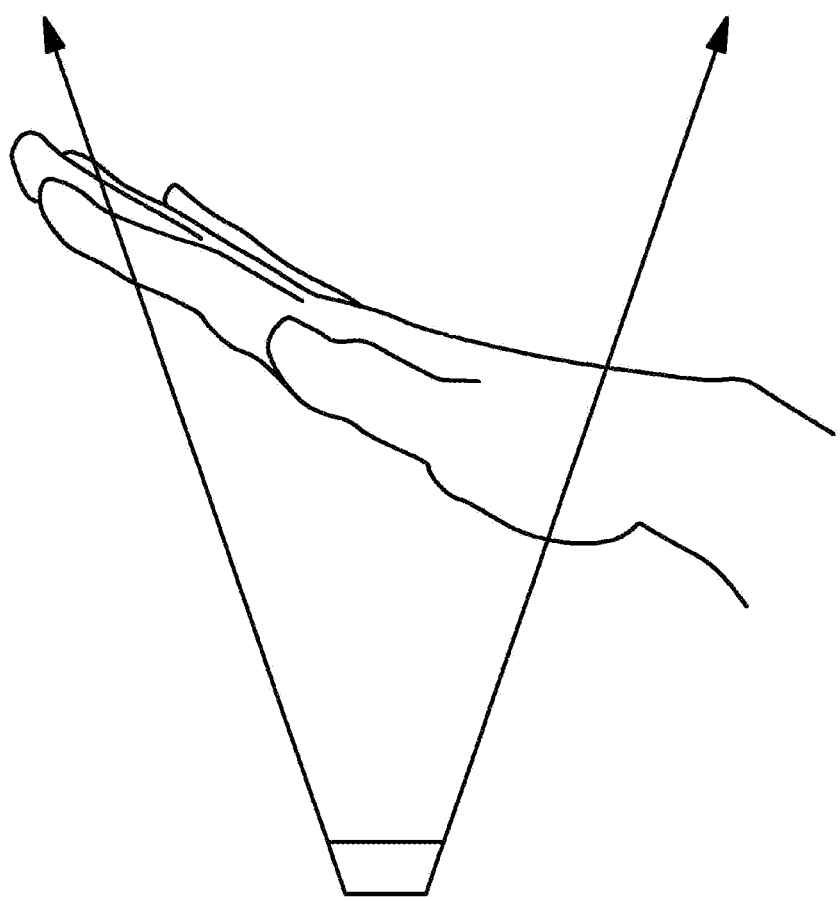
FIG. 4 illustrates a case where an image of a remained palm inclined to an image device is actually taken.

FIG. 4 illustrates a case where an image of a remained palm inclined to an imaging device is actually taken. When FIG. 3 and FIG. 4 are compared with each other, an imaging of a palm is different from each other. In the image of the palm getting closer to the rolling shutter type imaging device, the palm greatly extends in the scanning direction of the rolling shutter type imaging device, compared to the image of the remained palm that is actually taken.

When a biometric authentication is performed with use of an image of a palm that extends and is distorted compared to an actual palm, a feature quantity of the image does not correspond to a feature quantity of a registered image of a remained palm. Therefore, authentication accuracy may be degraded. A description will be given of an imaging device, an imaging method, and an imaging program that are capable of correcting a distortion of a taken image caused by a movement of an object.

First Embodiment

Figure 5A:
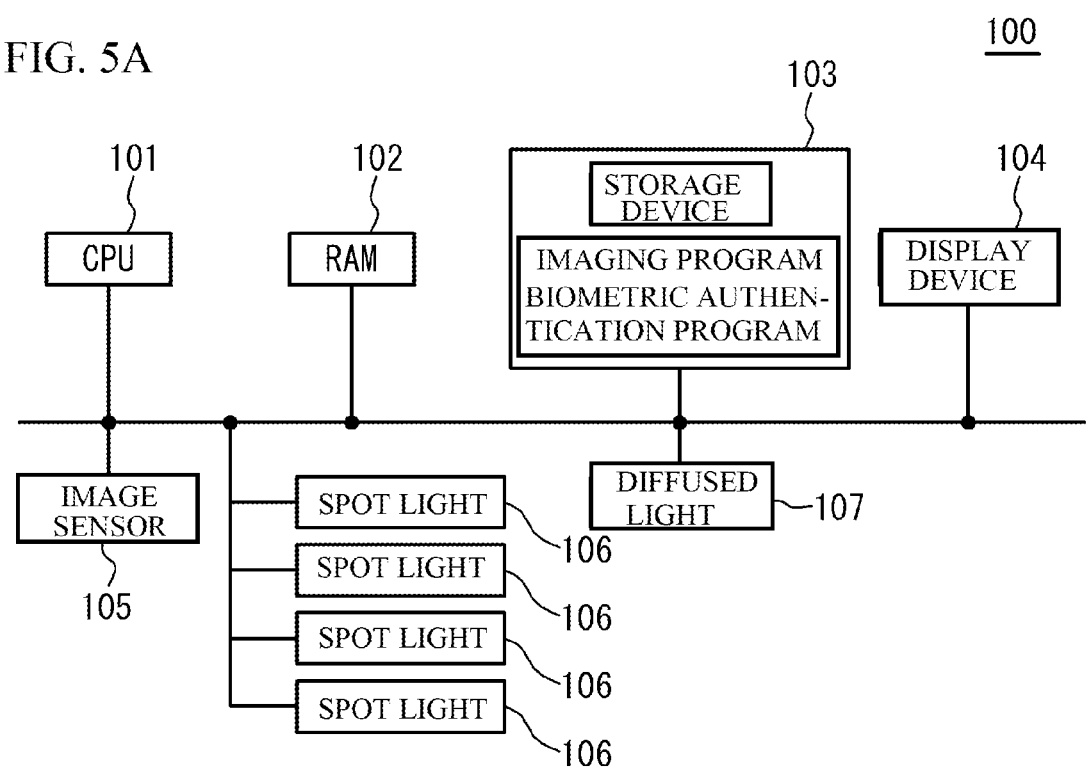
FIG. 5A illustrates a block diagram describing a hardware of a biometric authentication device in accordance with a first embodiment.

FIG. 5A illustrates a block diagram for describing a hardware structure of a biometric authentication device 100 in accordance with a first embodiment. As illustrated in FIG. 5A, the biometric authentication device 100 has a CPU 101, a RAM 102, a storage device 103, a display device 104, an image sensor 105, a plurality of spot light sources 106, a diffused light source 107, and so on.

The CPU 101 is a central processing unit. The CPU 101 has one or more cores. The RAM (Random Access Memory) 102 is a volatile memory that temporarily stores a program executed by the CPU 101, a data processed by the CPU 101, and so on. The storage device 103 is a non-volatile storage device. The storage device 103 may be a ROM (Read Only Memory), a solid state drive (SSD) such as a flash memory, or a hard disk driven by a hard disk drive. The storage device 103 stores an imaging program and a biometric authentication program.

The display device 104 is, for example, a liquid crystal display, an electroluminescence panel or the like, and displays a result of a biometric authentication process or the like. The image sensor 105 is a sensor of a rolling shutter type that generates an image of an object existing in an image area by taking images of each line in order that structures the image area. In the embodiment, the image sensor 105 generates an image of a palm of a user as an example. The spot light source 106 is a light source that radiates a spot light to a part of an object, and may be a light-emitting diode as an example. In the embodiment, a spot light having a rectangular shape appears in an image. The diffused light source 107 is a diffused light source that radiates a light to a whole of a palm, and may be a near-infrared-ray emitting lamp as an example.

Figure 5B:
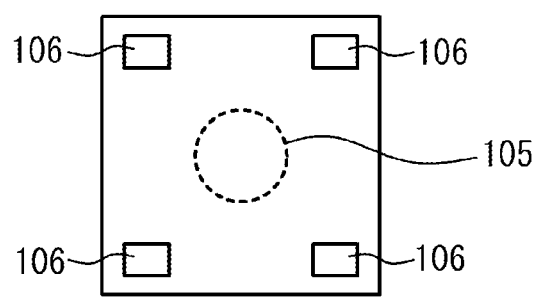
FIG. 5B illustrates a top view for describing a positional relation between an image sensor and a spot light source.

FIG. 5B illustrates a top view for describing a positional relation between the image sensor 105 and the spot light source 106. As illustrated in FIG. 5B, the plurality of spot light sources 106 are located around the image sensor 105. For example, the image sensor 105 is located in a center portion of a substrate having a rectangular shape. Each of the spot light sources 106 is located at each corner of the substrate. In FIG. 5B, the diffused light source 107 is omitted.

The imaging program and the biometric authentication program stored in the storage device 103 are developed to the RAM 102 so as to be executed. The CPU 101 executes the imaging program and the biometric authentication program developed to the RAM 102. Thus, the biometric authentication device 100 executes an image correction process and a biometric authentication process. The image correction process is a process for correcting a distortion of an image. The biometric authentication process is a process for identifying a user by a matching between a feature data for matching obtained during an authentication and a registered feature data registered in advance.

Figure 6:
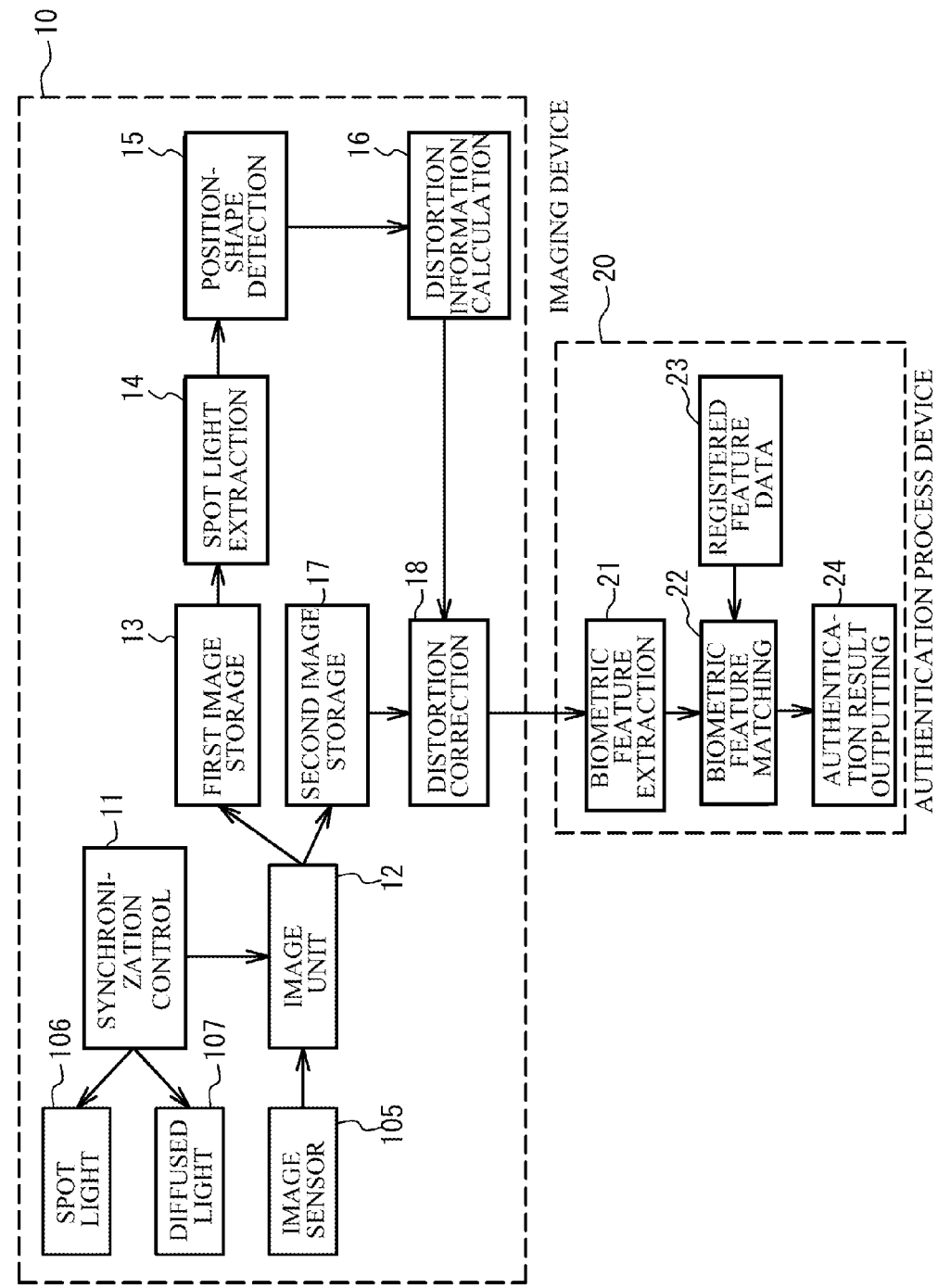
FIG. 6 illustrates a block diagram of each function realized by an execution of an imaging program and a biometric authentication program.

FIG. 6 illustrates a block diagram of each function realized by execution of the imaging program and the biometric authentication program. When the imaging program is executed, an imaging device 10 and an authentication process device 20 are realized in the biometric authentication device 100. The imaging device 10 acts as a synchronization control unit 11, an image unit 12, a first image storage unit 13, a spot light extraction unit 14, a position-shape detection unit 15, a distortion information calculation unit 16, a second image storage unit 17, and a distortion correction unit 18. The image sensor 105, the spot light source 106 and the diffused light source 107 also act as the imaging device 10. The authentication process device 20 acts as a biometric feature extraction unit 21, a biometric feature matching unit 22, a registered feature data storage unit 23 and an authentication result outputting unit 24.

Figure 7:
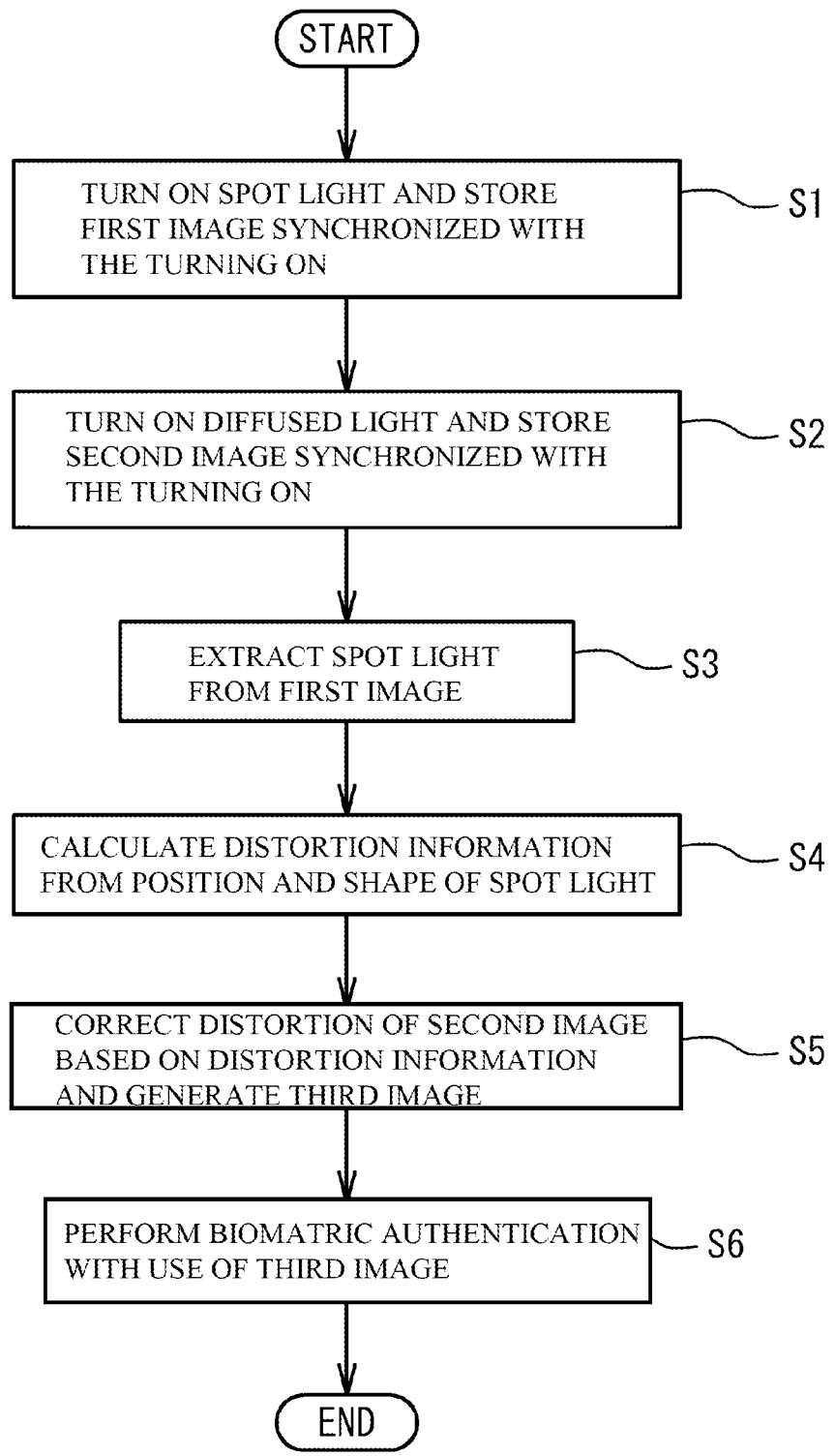
FIG. 7 illustrates an example of a flowchart executed by a biometric authentication device.

FIG. 7 illustrates an example of a flow chart executed by the biometric authentication device 100. In the flow chart of FIG. 7, Step S1 to Step S5 are the imaging process executed by the imaging device 10. Step S6 is the biometric authentication process executed by the authentication process device 20. As illustrated in FIG. 6 and FIG. 7, the synchronization control unit 11 turns on the spot light source 106, and instructs the image unit 12 to take an image. Thus, the image sensor 105 takes each image of each line of a palm of a user in order in synchronization with a lighting of the spot light source 106. The first image storage unit 13 stores the taken images as a first image (Step S1).

Next, the synchronization control unit 11 turns on the diffused light source 107, and instructs the image unit 12 to take an image. Thus, the image sensor 105 takes each image of each line of the palm of the user in order in synchronization with a lighting of the diffused light source 107. The second image storage unit 17 stores the taken images as a second image (Step S2). When a near-infrared ray is used as the diffused light source, an image including a pattern of veins under a skin of a body can be obtained. Next, the spot light extraction unit 14 extracts a spot light from the first image stored in the first image storage unit 13 (Step S3). Next, the position-shape detection unit 15 and the distortion information calculation unit 16 calculate distortion information of an image from a position and a shape of each spot light in the first image (Step S4).

In concrete, the position-shape detection unit 15 estimates an inclination of an object at a time when an image of a line of adjacent spot lights is taken, from positions of the adjacent spot lights in a portion corresponding to a predetermined line of the first image. For example, the position-shape detection unit 15 obtains a distance of the object at a time when an image of a line is taken by detecting distances between adjacent spot lights of each line. The position-shape detection unit 15 estimates an inclination of a palm by comparing the distances.

Figure 8A:
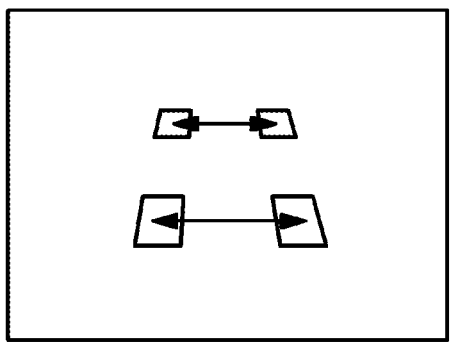
FIG. 8A and FIG. 8B illustrate a position of each spot light.
Figure 8B:
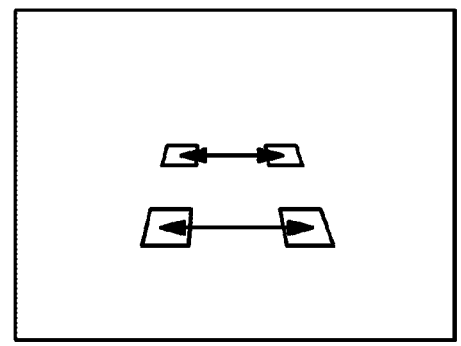

FIG. 8A illustrates a position of each spot light at a time when a remained palm is held obliquely with respect to a sensor face of the image sensor 105. As illustrated in FIG. 8A, the distances of the adjacent spot lights in each line are different from each other. When a palm moves during the taking of an image (the palm gets closer to the image sensor), as illustrated in FIG. 8B, distances between spot lights in a scanning direction are different from the distance of FIG. 8A. However, when the distances of the spot lights of each line are obtained, the inclination of the palm can be obtained even if the distances between the spot lights in the scanning direction are different from FIG. 8A.

When positions of spot lights between each line is detected and the detected positions are different from positions of spot lights at a time when an image of a remained object is taken, it may be determined that a distortion of a rolling shutter occurs. The position-shape detection unit 15 calculates a correction coefficient for correcting a position of each spot light (correction coefficient for canceling the distortion of the rolling shutter) so that a position of a spot light correspond to a position of a spot light without the distortion of the rolling shutter.

Figure 9A:
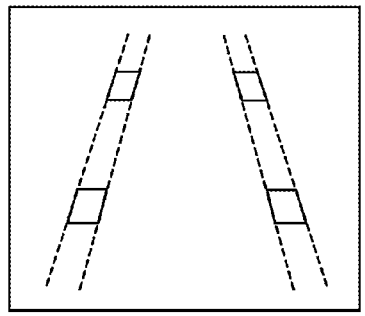
FIG. 9A to FIG. 9E illustrate a calculation of image distortion information.
Figure 9B:
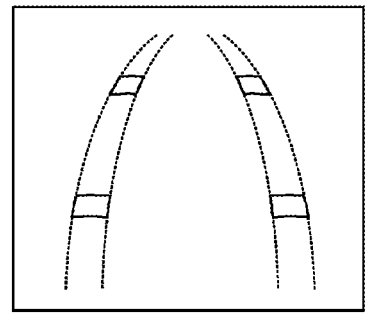
Figure 9B:
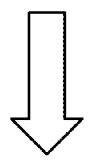

FIG. 9A illustrates a position and a shape of a spot light in an image to be generated when it is assumed that a spot light is radiated to a palm remained with an inclination detected by the position-shape detection unit 15. The position-shape detection unit 15 estimates the position and the shape of FIG. 9A with use of a distance between adjacent spot lights in each line of the first image. FIG. 9B illustrates a position and a shape of a spot light of an image (the first image) influenced by a distortion caused by a movement of an object.

Figure 9C:
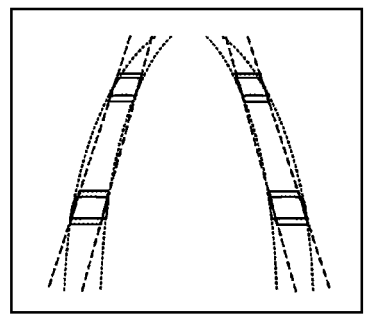
Figure 9C:
Figure 9D:
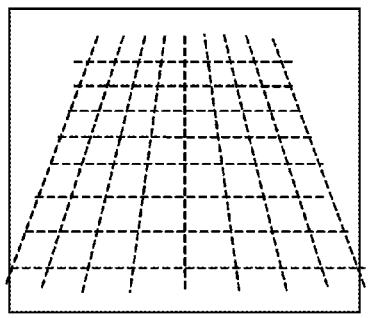
Figure 9E:
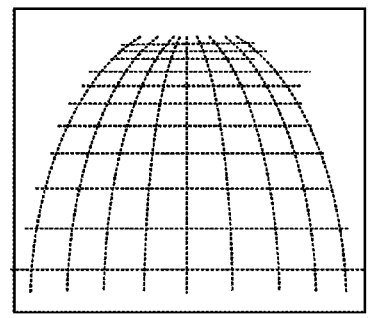

The distortion information calculation unit 16 calculates distortion information of a whole of a taken image by an interpolation or an extrapolation from a distortion of a shape of a spot light, as illustrated in FIG. 9C. Thus, a distorted lattice influenced by a distortion caused by a movement of an object of FIG. 9E is calculated. The lattice of FIG. 9E is a distorted lattice of FIG. 9D not including an influence of a distortion at a time when a remained palm illustrated is held obliquely with respect to the image sensor. The distorted lattice of FIG. 9E is used as image-distortion information.

Figure 10A:
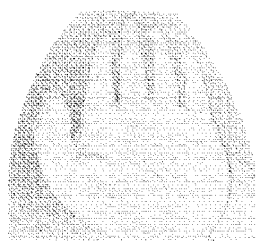
FIG. 10A to FIG. 10E illustrate a correction of a taken image.
Figure 10A:
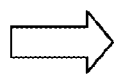
Figure 10C:
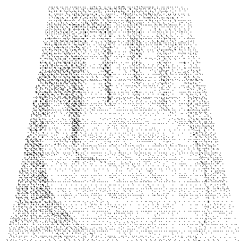
Figure 10C:
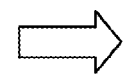
Figure 10E:
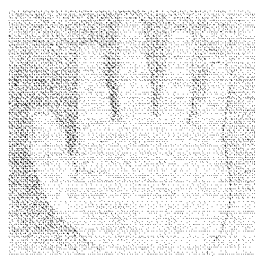
Figure 10E:
Figure 10B:
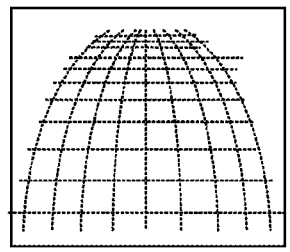
Figure 10B:
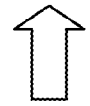
Figure 10D:
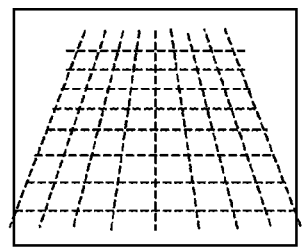

With reference to FIG. 6 and FIG. 7 again, the distortion correction unit 18 corrects the second image stored in the second image storage unit 17 with use of the image distortion information calculated in Step S3. FIG. 10A illustrates an example of the second image. The second image is an image including an influence of the inclination and the distortion of the object. The distortion correction unit 18 corrects the second image so that the distortion of the second image caused by the rolling shutter is canceled with use of the obtained image distortion information (FIG. 10B). In concrete, the distortion of the second image is corrected so that the distorted lattice illustrated in FIG. 10B is converted into a lattice of FIG. 10D not including the influence of the distortion. Thus, the image of FIG. 10C is obtained. The distortion correction unit 18 corrects the inclination of the palm in the image of FIG. 10C with use of the lattice (FIG. 10D) not including the influence of the distortion at the time when the palm is remained and is inclined with respect to the sensor face. Thus, the third image (FIG. 10E), in which the palm is remained and is in parallel with the sensor face of the image sensor 105, is generated (Step S5).

The authentication process device 20 performs the biometric authentication process with use of the third image obtained in Step S5 (Step S6).

In concrete, the biometric feature extraction unit 21 extracts a biometric feature from the third image. Next, the biometric feature matching unit 22 calculates a similarity between the registered feature data registered in the registered feature data storage unit 23 and the biometric feature extracted by the biometric feature extraction unit 21. The biometric feature matching unit 22 determines that the matching is succeeded when the similarity is equals to a threshold or more. The result of the matching by the biometric feature matching unit 22 is output to the display device 104 by the authentication result outputting unit 24. When the above-mentioned processes are finished, the execution of the flowchart is terminated.

In the embodiment, an imaging device of rolling shutter type taking an image of each line structuring an image area in order is used, and a distortion of a taken image caused by a movement of an object can be corrected. Thus, authentication accuracy of the biometric authentication can be improved.

Another Example

A position and a size of a spot light in a taken image may differ because of individual variability of imaging devices. The difference caused by the individual variability may be corrected in advance by a calibration process for correcting the difference caused by the individual variability.

In the above-mentioned embodiment, the rectangular shaped spot light is used. However, the shape of the spot light is not limited. Even if the spot light has another shape such as a circular shape or an ellipse shape, the lattice distorted because of the influence of the distortion caused by the movement of the object can be calculated with use of the shape of the spot light in a taken image. In the above-mentioned embodiment, a palm is used as an object. However, another biometric body may be used as an object.

Figure 11A:
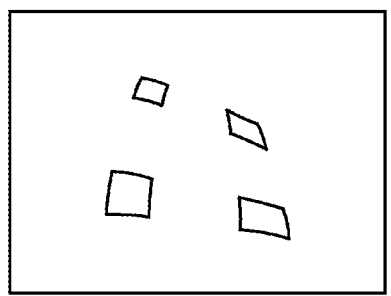
FIG. 11A to FIG. 11C illustrate an example of a correction of a rotation.
Figure 11B:
Figure 11C:
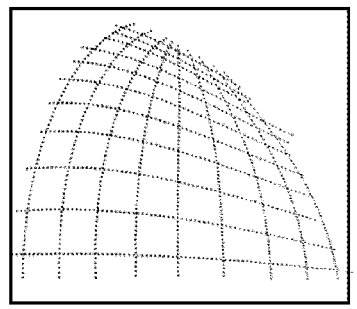

The size of the spot light in a taken image may differ when the object is rotated during the imaging by the image sensor 105. And so, the rotation of the object may be corrected when the difference of the size of the spot light is equals to a threshold or more. When the object rotates, as illustrated in FIG. 11A and FIG. 11B, the spot light and the palm are distorted in an inclination direction in a taken image. The distortion correction unit 18 may generate a lattice pattern for correction illustrated in FIG. 11C based on an image of the spot light of FIG. 11A.

Figure 12A:
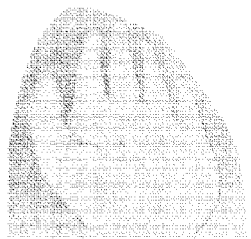
FIG. 12A to FIG. 12E illustrate a correction of a taken image.
Figure 12C:
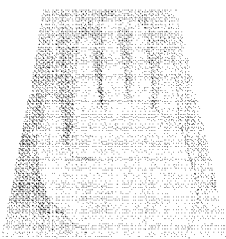
Figure 12E:
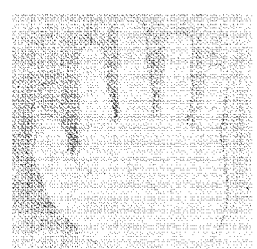
Figure 12B:
Figure 12D:

FIG. 12A illustrates an example of the second image including the influence of the rotation. The distortion correction unit 18 uses the obtained image distortion information (FIG. 12B) and corrects the distortion of the second image caused by the rolling shutter. Thus, the image of FIG. 12C is obtained. The distortion correction unit 18 corrects the image of FIG. 12C with use of the lattice (FIG. 12D) not including the influence of the distortion at the time when the palm is remained and is inclined with respect to the sensor face. Thus, the third image (FIG. 12E), in which the palm is remained and is in parallel with the image sensor 105, is generated.

Figure 13:
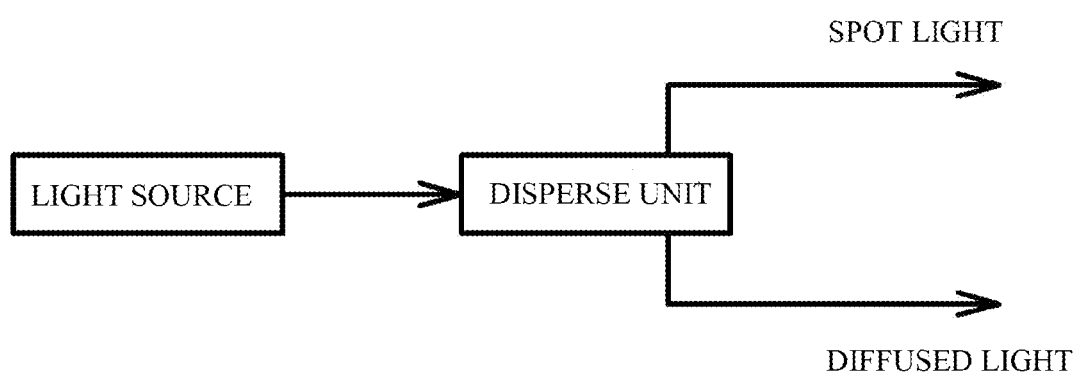
FIG. 13 illustrates another example of a spot light source and a diffused light source.

The spot light source 106 and the diffused light source 107 may be light sources obtained from a single light source. In concrete, as illustrated in FIG. 13, an electronic control unit, an optical disperse unit, a mechanical rotation unit or the like may generate a spot light source and a diffused light source by dispersing a light from a single light source.

Second Embodiment

In the first embodiment, the first image taken when the diffused light source 107 is turned off and the spot light source 106 is turned on and the second image taken when the spot light source 106 is turned off and the diffused light source 107 is turned on are used. However, the structure is not limited. An image taken when both of the spot light source 106 and the diffused light source 107 are turned on may be used. A description will be given of a second embodiment.

Figure 14:
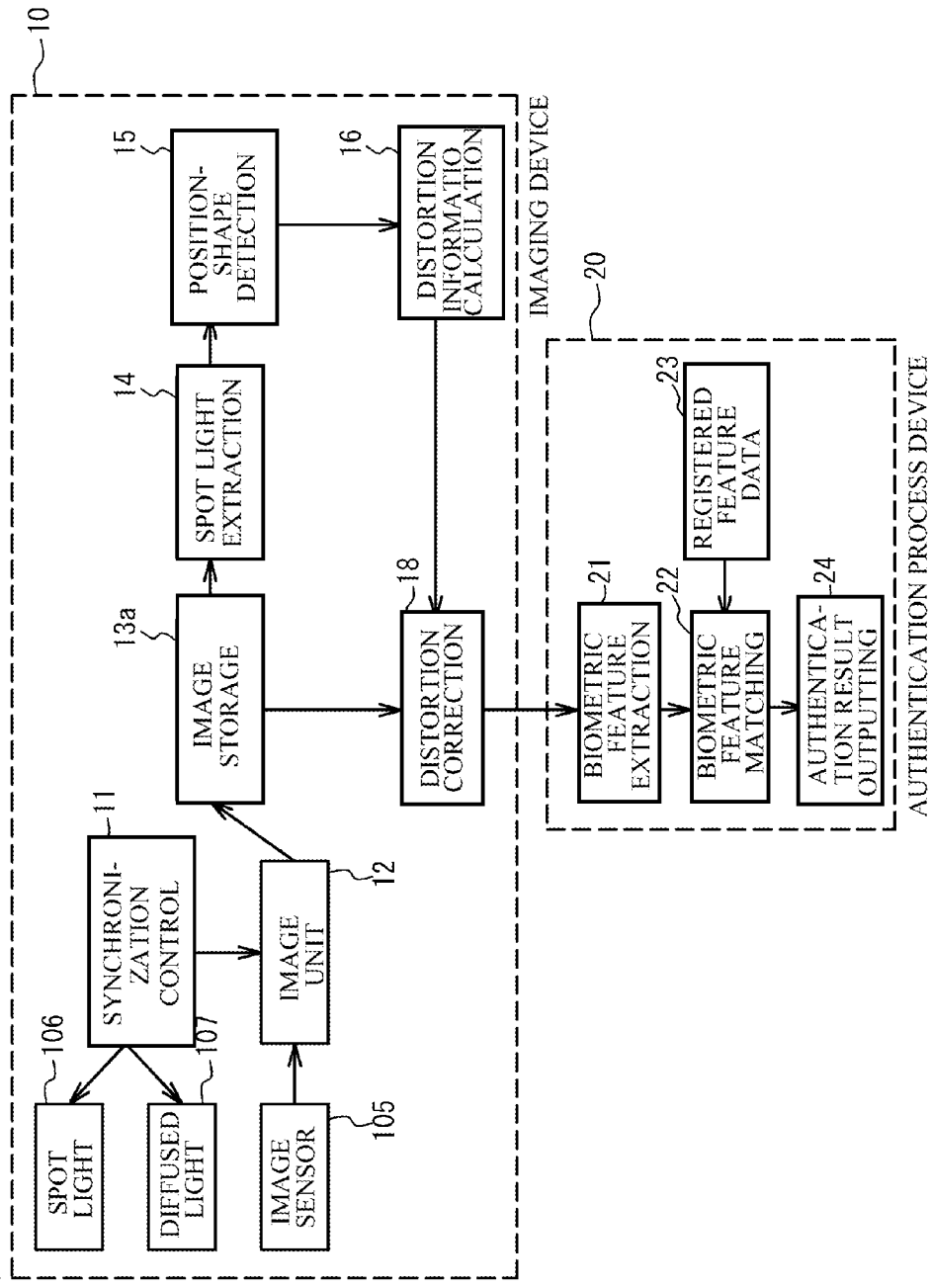
FIG. 14 illustrates a block diagram of each function realized by execution of an imaging program and a biometric authentication program in accordance with a second embodiment.

FIG. 14 illustrates a block diagram of each function realized by an execution of an imaging program and a biometric authentication program in accordance with the second embodiment. FIG. 14 is different from FIG. 6 in points that an image storage unit 13a is provided instead of the first image storage unit 13, and the second image storage unit 17 is not provided.

Figure 15:
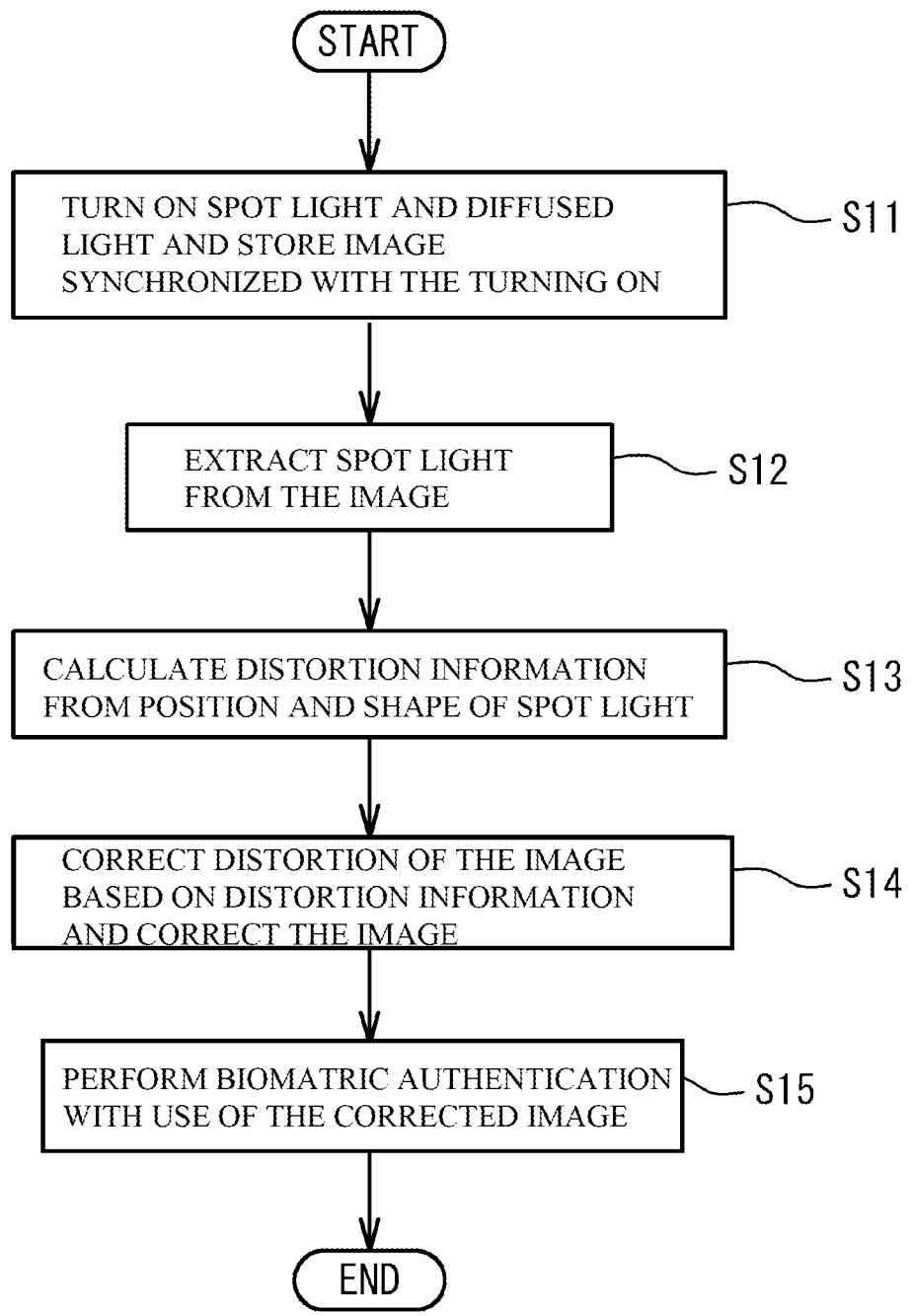
FIG. 15 illustrates an example of a flowchart in accordance with the second embodiment.

FIG. 15 illustrates an example of a flow chart in accordance with the embodiment. As illustrated in FIG. 14 and FIG. 15, the synchronization control unit 11 turns on the spot light source 106 and the diffused light source 107, and instructs the image unit 12 to take an image. Thus, the image sensor 105 takes an image of each line of a palm of a user in order under a condition where both of the spot light and the diffused light are radiated. A taken image is stored by the image storage unit 13a (Step S11).

Next, the spot light extraction unit 14 extracts a spot light from a taken image stored by the image storage unit 13a (Step S12). In concrete, the spot light in the taken image can be detected based on a brightness value or a wavelength. Next, the position-shape detection unit 15 and the distortion information calculation unit 16 calculate distortion information of an image from a position and a shape of the taken image (Step S13). Step S13 is the same as Step S4 of FIG. 7. The distortion correction unit 18 uses the image distortion information calculated in Step S13 and corrects the distortion of the taken image stored in the image storage unit 13a (Step S14). Step S14 is the same as Step S5 of FIG. 7. Next, the authentication process device 20 uses the corrected image obtained in Step S14 and performs a biometric authentication process (Step S15). Step S15 is the same as Step S6 of FIG. 7. When the above-mentioned processes are finished, the execution of the flow chart is terminated.

In the second embodiment, an image taken under a condition where both of a spot light and a diffused light are radiated is used, and the distortion of the image caused by a movement of an object can be corrected. The influence of the movement of the object can be restrained because it is not necessary to generate a plurality of images.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various change, substitutions, and alterations could be made hereto without departing from the spirit and scope of the invention.

What is claimed is:

1. An imaging device comprising:
    a plurality of spot light sources, each of which radiates a spot light to an object;
    an image sensor configured to generate a taken image of the object in an image area by taking an image of each line structuring the image area; and
    a processor configured to execute a process including:
    estimating an inclination of the object based on a portion of a first taken image corresponding to a first line and another portion of the first taken image corresponding to a second line, the first taken image being a taken image that is taken by the image sensor and includes the portion corresponding to the first line and the another portion corresponding to the second line;
    estimating, based on the inclination estimated by the estimating of the inclination, an image of the object that is to be generated when the object has the inclination and the image is taken; and
    correcting a second taken image based on a result of a comparison between a distance between the spot light in the portion of the first taken image corresponding to the first line and the spot light in the another portion of the first taken image corresponding to the second line and a distance between the spot light in a portion of the image estimated by the estimating of the image corresponding to the first line and the spot light in another portion of the image estimated by the estimating of the image corresponding to the second line, the second taken image being one of the first taken image and another taken image taken by the image sensor.

2. The imaging device as claimed in claim 1, wherein in the estimating of the inclination, the inclination of the object is estimated based on a position of the spot light in the portion of the first taken image corresponding to the first line and a position of the spot light in the another portion of the first taken image corresponding to the second line.

3. The imaging device as claimed in claim 1, wherein in the correcting, the second taken image is corrected based on the position and a shape of the spot light in the first taken image.

4. The imaging device as claimed in claim 1, further comprising:
    a diffused light source that radiates a diffused light to a whole of the object,
    wherein:
    in the estimating of the inclination, the inclination of the object is estimated based on the first taken image that is obtained under a condition that each of the plurality of spot light sources radiates the spot light to the object; and
    in the correcting, the second taken image is corrected under a condition that the diffused light source radiates the diffused light to the object.

5. The imaging device as claimed in claim 1, further comprising:
    a diffused light source that radiates a diffused light to a whole of the object,
    wherein
    in the estimating of the inclination, the spot light is detected based on a brightness value or a wavelength of a reflected light in the first taken image under a condition that each of the plurality of spot light sources radiates the spot light to the object and the diffused light source radiates the diffused light to the object.

6. The imaging device as claimed in claim 4, wherein the diffused light source is a near-infrared light source.

7. The imaging device as claimed in claim 1, wherein the plurality of spot light sources and the diffused light source are a light sources obtained from a single light source.

8. An imaging method comprising:
    radiating a plurality of spot lights to an object from a plurality of spot light sources;
    generating a taken image of the object in an image area by taking an image of each line structuring the image area with use of an image sensor;

estimating an inclination of the object based on a portion of a first taken image corresponding to a first line and another portion of the first taken image corresponding to a second line, the first taken image being a taken image that is taken by the image sensor and includes the portion corresponding to the first line and the another portion corresponding to the second line;

estimating, based on the inclination estimated by the estimating of the inclination, an image of the object that is to be generated when the object has the inclination and the image is taken; and correcting a second taken image based on a result of a comparison between a distance between the spot light in the portion of the first taken image corresponding to the first line and the spot light in the another portion of the first taken image corresponding to the second line and a distance between the spot light in a portion of the image estimated by the estimating of the image corresponding to the first line and the spot light in another portion of the image estimated by the estimating of the image corresponding to the second line, the second taken image being one of the first taken image and another taken image taken by the image sensor.

9. A non-transitory computer-readable medium storing a program that causes a computer to execute a process, the process comprising:

radiating a plurality of spot lights to an object from a plurality of spot light sources;

generating a taken image of the object in an image area by taking an image of each line structuring the image area with use of an image sensor;

estimating an inclination of the object based on a portion of a first taken image corresponding to a first line and another portion of the first taken image corresponding to a second line, the first taken image being a taken image that is taken by the image sensor and includes the portion corresponding to the first line and the another portion corresponding to the second line;

estimating, based on the inclination estimated by the estimating of the inclination, an image of the object that is to be generated when the object has the inclination and the image is taken; and correcting a second taken image based on a result of a comparison between a distance between the spot light in the portion of the first taken image corresponding to the first line and the spot light in the another portion of the first taken image corresponding to the second line and a distance between the spot light in a portion of the image estimated by the estimating of the image corresponding to the first line and the spot light in another portion of the image estimated by the estimating of the image corresponding to the second line, the second taken image being one of the first taken image and another taken image taken by the image sensor.

10. The imaging device as claimed in claim 2, wherein in the estimating of the inclination, the inclination of the object is estimated based on a distance between two spot lights in the portion of the first taken image corresponding to the first line and a distance between two spot lights in the another portion in the first taken image corresponding to the second line.

* * * * *